(12) United States Patent
Wang

(10) Patent No.: US 8,991,708 B2
(45) Date of Patent: Mar. 31, 2015

(54) METHOD AND SYSTEM FOR INTERACTION BETWEEN PAPER MEDIA AND READER

(71) Applicant: Peking University Founder Group Co., Ltd., Beijing (CN)

(72) Inventor: Yongqiang Wang, Beijing (CN)

(73) Assignees: Peking University Founder Group Co., Ltd., Beijing (CN); Beijing Founder Electronics Co., Ltd., Beijing (CN)

( * ) Notice: Subject to any disclaimer, the term of this patent is extended or adjusted under 35 U.S.C. 154(b) by 0 days.

(21) Appl. No.: 14/086,756

(22) Filed: Nov. 21, 2013

(65) Prior Publication Data

US 2014/0138442 A1    May 22, 2014

(30) Foreign Application Priority Data

Nov. 22, 2012 (CN) .......................... 201210479551.1

(51) Int. Cl.
*G06K 7/10* (2006.01)
*G06K 7/14* (2006.01)
(52) U.S. Cl.
CPC ..................................... *G06K 7/146* (2013.01)
USPC .................................................... 235/462.41
(58) Field of Classification Search
CPC .... G06K 7/1404; G06K 7/1417; G06K 7/146

USPC ........................ 235/454, 462.41, 462.01, 494
See application file for complete search history.

(56) References Cited

U.S. PATENT DOCUMENTS 8,342,406 B2 * 1/2013 Saunders et al. ......... 235/462.01

* cited by examiner

*Primary Examiner* — Seung Lee
(74) *Attorney, Agent, or Firm* — Lowe Hauptman & Ham, LLP

(57) ABSTRACT

The embodiments of the present invention provide a method and a system for interaction between a paper media and a reader. A 2D barcode scanning means (1) scans an image of a 2D barcode in the paper media; a 2D barcode identification means (2) identifies a data structure of the image of the 2D barcode and displays items to be fed back by the reader on a terminal; an identification feedback means (3) transmits the feedback from the reader to a feedback response means (4); and the feedback response means (4), after receiving the feedback from the reader, displays the feedback and responds to it by the paper media. According to the embodiments of the present invention, it is able to relieve an increasing impact of a new media such as Internet, mobile Internet and tablet PC on the paper media, and to inspire the reader to interact with the paper media, thereby to provide convenient and efficient interaction and communication between the paper media and the reader and to enhance intimacy therebetween.

13 Claims, 3 Drawing Sheets a    b    c    d

METHOD AND SYSTEM FOR INTERACTION BETWEEN PAPER MEDIA AND READER

RELATED APPLICATIONS

The present application is based on and claims priority to Chinese Application Number 201210479551.1, filed Nov. 21, 2012, the disclosure of which is hereby incorporated by reference herein in its entirety.

TECHNICAL FIELD

The present invention relates to the application of a two dimensional barcode to a paper media, in particular to a method and a system for interaction between a paper media and a reader.

BACKGROUND

Recently, for interaction between a paper media, such as a newspaper, a magazine and a periodical, and a reader, usually the paper media publishes the newspaper, magazine or periodical which is bought or subscribed by the reader. When reading the newspaper, magazine or periodical, sometimes the reader may have opinions or suggestions on some contents, and want to provide feedback to the paper media, usually by mails, e-mails or telephones. However, these traditional ways are poor in timeliness, efficiency and traceability. In addition, due to the impact of a new media, such as network and TV, on the paper media, these traditional ways for interaction and communication with the reader are far cry from meeting the requirements of the paper media and the reader.

A two-dimensional (2D) barcode is used to record data symbol information by using black-and-white patterns obtained by distributing specific geometric patterns in a plane (in 2D directions) according to a certain rule. When encoding, it subtly takes the advantage of a bit stream of "0" and "1" that constitutes a basis for an internal logic of a computer, and uses several geometric shapes corresponding to binary numbers to represent character value information, and then it is automatically read by an image inputting device or a photoelectric scanner so as to achieve automatic information processing. It has some similarities of the barcode technology, e.g., each code system has its own character set, each character has a certain width, and it has a certain checking function. Also, it can automatically identify the information in different rows and process graphical rotation changes. Among various 2D barcodes, the commonly-used ones include Data Matrix, Maxi Code, Aztec, QR Code, Vericode, PDF417, Ultracode, Code 49, Code 16K, etc.

SUMMARY

An object of the present invention is to provide a method and a system for interaction between a paper media and a reader, so as to solve the problems during the interaction between the paper media and the reader, such as poor timeliness, efficiency and traceability, thereby to relieve the impact of a new media on the paper media.

In one aspect, an embodiment of the present invention provides a method for interaction between a paper media and a reader, comprising:

Step 1: scanning, by a 2D barcode scanning means, an image of a 2D barcode in the paper media, and transmitting a scanning result to a 2D barcode identification means;

Step 2: identifying, by the 2D barcode identification means, a data structure of the image of the 2D barcode, displaying, on a terminal, items to be fed back by the reader, and when the reader selects an item for feedback, calling an identification feedback module API and notifying an identification feedback means;

Step 3: displaying, by the identification feedback means, the item selected by the reader and the feedback about the item, and transmitting the feedback to a feedback response means; and Step 4: after the feedback response means receives the feedback from the reader, displaying the feedback and responding to it by the paper media.

In another aspect, another embodiment of the present invention also provides a system for interaction between a paper media and a reader, comprising a client and a server. The client comprises a 2D barcode scanning means configured to scan an image of a 2D barcode in the paper media, and transmit a scanning result to a 2D barcode identification means; the 2D barcode identification means configured to identify a data structure of the image of the 2D barcode, display items to be fed back by the reader, and when the reader selects an item for feedback, call an identification feedback module API and notify an identification feedback means; and the identification feedback means configured to display the item selected by the reader and the feedback about the item, and transmit the feedback to a feedback response means of the server. The server comprises the feedback response means configured to, after receiving the feedback from the reader, display the feedback and respond to it by the paper media.

The embodiments of the present invention have the following advantageous effects. According to the embodiments of the present invention, the 2D barcode scanning means scans the image of the 2D barcode in the paper media and transmits the scanning result to the 2D barcode identification means, the 2D barcode identification means identifies the data structure of the image of the 2D barcode and displays the items to be fed back by the reader on the terminal, the identification feedback means transmits the feedback from the reader to the paper media, and the feedback response means displays the feedback from the reader and responds to it. As a result, according to the method and system provided by embodiments of the present invention, it is able to improve the timeliness, convenience and traceability of the feedback and response between the paper media and the reader, thereby to enhance the intimacy between the paper media and the reader.

DETAILED DESCRIPTION

The embodiments of the present invention are described hereinafter in conjunction with the drawings and the embodiments.

An embodiment of the present invention provides a method for interaction between a paper media and a reader, and it relates to the interaction between the paper media and the reader and the application of a 2D barcode to the paper media, so as to relieve an increasing impact of a new media, such as Internet, mobile Internet and tablet PC, on the paper media. Currently, the paper media is a read-only and one-way media. Once the newspaper has been published, the reader can only read it. If there is feedback about contents, events and demands in the newspaper, the reader can only communicate with a newspaper office merely by mails, e-mails or telephones. Such communication ways are poor in timeliness, convenience, traceability and innovativeness. As a result, the newspaper cannot function as a weapon for supervision of public opinions timely, and the effect thereof is not well-being. However, according to the embodiments of the present invention, the reader can be inspired to interact with the paper media, and it is able to provide convenient and efficient interaction and communication between the paper media and the reader, thereby to relieve the impact of the new media on the paper media and to enhance the intimacy between the paper media and the reader.

Figure 3:
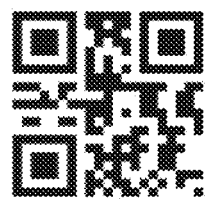
FIG. 3 is a schematic view showing an image of a 2D barcode.

A two-dimensional (2D) barcode is used to record data symbol information with black-and-white patterns obtained by distributing specific geometric patterns in a plane (in 2D directions) according to a certain rule. When encoding, it subtly takes the advantage of a bit stream of "0" and "1" that constitutes a basis for an internal logic of a computer, and uses several geometric shapes corresponding to binary numbers to represent character value information, and then it is automatically read by an image inputting device or a photoelectric scanner so as to achieve automatic information processing. It has some similarities of the barcode technology, e.g., each code system has its own character set, each character has a certain width, and it has a certain checking function. Also, it can automatically identify the information in different rows and process graphical rotation changes. Among various 2D barcodes, the commonly-used ones include Data Matrix, Maxi Code, Aztec, QR Code, Vericode, PDF417, Ultracode, Code 49, Code 16K, etc. The 2D barcode may be printed onto the newspaper by the paper media, as shown in FIG. 3.

Figure 1:
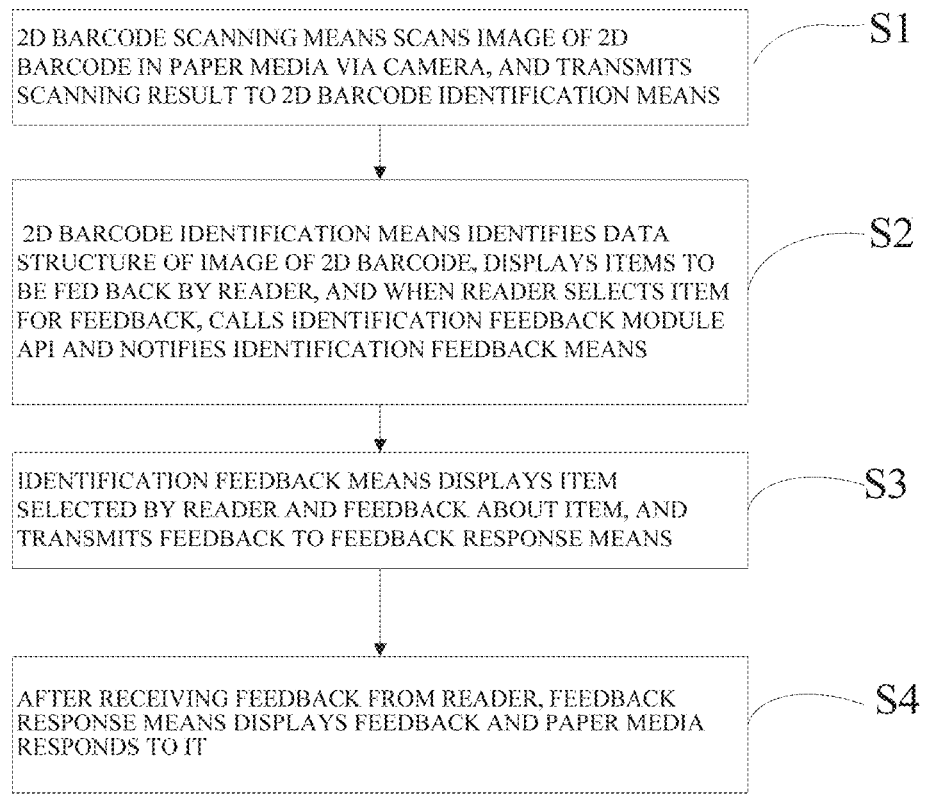
FIG. 1 is a flow chart of a method for interaction between a paper media and a reader according to an embodiment of the present invention.

As shown in FIG. 1, the method for interaction between the paper media and the reader according to the embodiments of the present invention comprises the following steps.

Step S1: a 2D barcode scanning means scans an image of a 2D barcode in the paper media via a camera of a terminal, and transmits a scanning result to a 2D barcode identification means.

Figure 4:
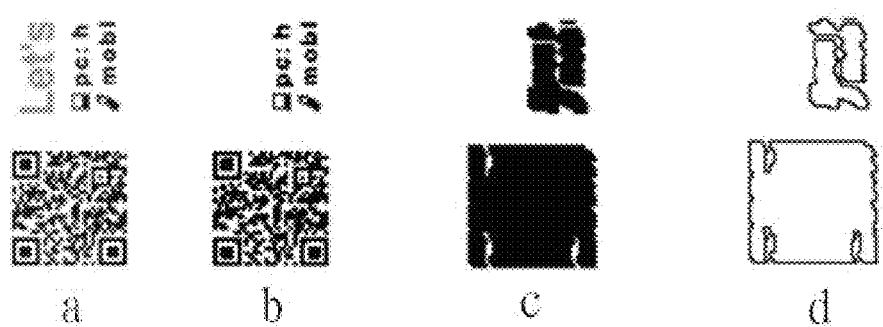
FIG. 4 is a structural view showing the image of the 2D barcode after positioning process.

Step S2: the 2D barcode identification means identifies a data structure of the image of the 2D barcode, converts the scanned image of the 2D barcode into a machine language in the form of 0 and 1 according to the information structure as shown in FIG. 4, and then converts the machine language into words that can be recognized and displays them on the terminal. These words are just items to be fed back by the reader, and these items, such as comments on an article and correcting misspellings, have been set in a system when the 2D barcode is generated. When the reader selects an item for feedback, an identification feedback module API will be called to notify an identification feedback means.

Step S3: the identification feedback means displays the item selected by the reader and the feedback about the item, and transmits the feedback to a feedback response means via Internet, Wifi and WLAN, etc.

In one embodiment, after a user scans the image of the 2D barcode in the paper media via a mobile phone, the identification feedback means will provide two items, e.g., "comments on an article" and "correcting misspellings", according to the data structure of the image of the 2D barcode identified by the 2D barcode identification means. If the user selects "comments on an article", the identification feedback means will call the identification feedback module API, and an interface about "comments on an article" will appear on the mobile phone. After inputting the comments on an article, the user can click a "release" button to transmit the comments to the feedback response means.

Step S4: after receiving the feedback from the reader, the feedback response means displays the feedback and the paper media responds to it.

In the above embodiment, after the comments on an article are released by the user, a prompt indicating that there are new comments on the article will be seen in an editing platform of the paper media, such as an editing system. An editor will make a response on the user's comments, and transmit the response to the user's mobile phone via the feedback response means, together with a prompt "a response from editor".

In step S1, the image of the 2D barcode in the paper media may be scanned via a camera by using terminal software on a mobile phone, a tablet computer or a PC, such as client software on iPhone or any other smart phone running an Android system, or desktop software on a computer.

Usually, the paper media has its own editing system, and the terminal software and the paper media system will access to a same database. Hence, the method of the present invention can be used to achieve repeated feedback and response between the reader and the paper media by a pushing method.

Figure 5:
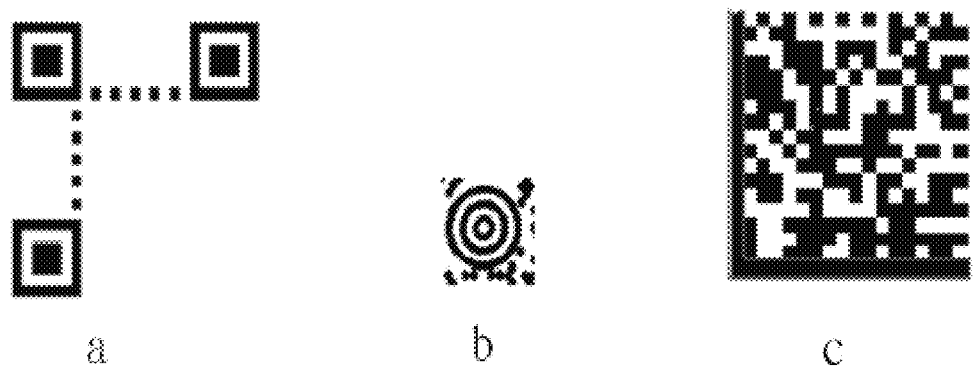
FIG. 5 shows several common matrix barcodes.

FIGS. 4-5 show the principles for the identification of the 2D barcode. In step S2, the 2D barcode identification means identifies the data structure of the image of the 2D barcode in the following steps:

(A) converting the collected image of the 2D barcode into a binary image according to a threshold theory of a point operation, i.e., performing binarization operation on the image of the 2D barcode;

(B) after acquiring the binary image, performing dilation operation thereon; and (C) performing edge detection on the dilated image to obtain a profile of a barcode region.

Through the above steps, a series of images will be obtained as shown in FIG. 4, in which a represents an original image, b represents a binary image, c represents a dilated image, and d represents an image after the edge detection.

In step (A), the binarization operation on the image of the 2D barcode is performed by the following equation:

$$g(x, y) = \begin{cases} 255 & f(x, y) \geq T \\ 0 & f(x, y) < T. \end{cases}$$

where f(x,y) represents a gray value of a pixel at point (x,y), and T represents a threshold (an adaptive threshold).

In step (B), dilation transformation in mathematical morphology is used, and A is dilated by B as:

$$A \oplus B = \{x \mid [(\hat{B})_x \cap A] \neq \Phi\}.$$

The dilation operation on the binary image is just performed by the above equation.

In step (C), after finding the barcode region, it is further required to determine the type of the matrix barcode. FIG. 5 shows several common matrix barcodes. FIG. 5a shows finder patterns of QR code, i.e., three finder patterns on the upper left corner, the lower left corner and the upper right corner. FIG. 5b shows a finder pattern of MaxiCode, i.e., a finder pattern with three equidistant, concentric rings (called as Bull's eye) in the middle of the symbol. FIG. 5c shows a finder pattern of DataMatrix, i.e., two solid line segments perpendicular to each other and located on the left and at the bottom.

In Step (C), a border of the barcode region after the edge detection is somewhat incomplete, so it is required to modify the border, and then split out a complete barcode region. The method of modifying the border comprises:

(1) dividing the symbol from a small region (seed) within the symbol using a region growing method, so as to modify the border of the barcode and include all points of the symbol within the border;

(2) accurately splitting out the entire symbol through convex hull algorithm; and (3) performing the region growing and convex hull algorithm alternately, so as to perform the region growing and convex hull algorithm twice on the barcode with a large density for the modular combination, and four times on the barcode with a small density for the modular combination.

Figure 2:
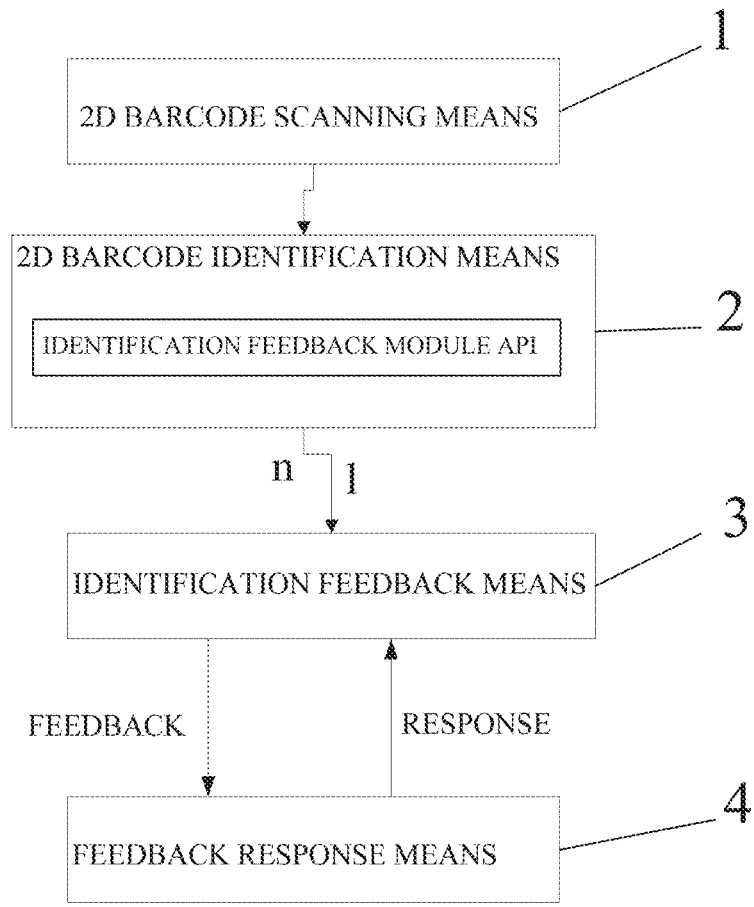
FIG. 2 is a schematic view showing a system for interaction between a paper media and a reader according to the embodiment of the present invention.

Another embodiment of the present invention further provides a system for interaction between a paper media and a reader, which is shown in FIG. 2. The system comprises a client and a server. The client comprises a 2D barcode scanning means 1 configured to scan an image of a 2D barcode in the paper media, and transmit a scanning result to a 2D barcode identification means 2; the 2D barcode identification means 2 configured to identify a data structure of the image of the 2D barcode, display items to be fed back by the reader, and when the reader selects an item for feedback, call an identification feedback module API and notify an identification feedback means 3; and the identification feedback means 3 configured to display the item selected by the reader and the feedback about the item, and transmit the feedback to a feedback response means 4 of the server. The server comprises the feedback response means 4 configured to, after receiving the feedback from the reader, display the feedback and respond to it by the paper media.

In one embodiment, the reader may use the 2D barcode scanning means 1 in terminal software of a smart phone, a tablet computer or a PC to scan the image of the 2D barcode in the paper media. This scanning means may be a camera of the smart phone, the tablet computer or the PC. After the scanning is completed, the scanning result will be transmitted to the 2D barcode identification means 2. The 2D barcode identification means 2, after receiving the scanning result from the 2D barcode scanning means 1, will identify the data structure of the 2D barcode and display the items to be fed back by the reader on the terminal. After the reader selects an item, the 2D barcode identification means 2 will call the identification feedback module API, and notify the identification feedback means 3. When it is identified that an item has been selected by the reader, the identification feedback means 3 will display the contents about the item to the reader for feedback. The feedback may be comments on the contents in the newspaper or correcting misspellings. After the feedback is provided by the reader, the identification feedback means 3 will transmit the feedback to the feedback response means 4 of the server via Internet, Wifi or WLAN. The feedback response means 4 will display the feedback from the reader, and the paper media, after receiving the feedback, will make a response to it. The reader may provide his feedback repeatedly, and the paper media may make a response repeatedly too. After the response is made, the feedback response means 4 will prompt, by the terminal software, the reader that there is a response to the feedback. The feedback response means 4 may also release the feedback and the response.

According to the embodiments of the present invention, it is able to improve the timeliness, convenience and traceability of the feedback and response between the paper media and the reader, thereby to enhance the intimacy therebetween.

It is should be appreciated that, the above preferred embodiments are merely for illustrative purposes, and a person skilled in the art may make further improvements and variations based thereon, and these improvements and variations also fall within the scope of the present invention. A person skilled in the art shall understand that the above descriptions are merely for illustrative purposes but not used to limit the present invention. The scope of the present invention is intended to be defined by the claims and the equivalents thereof.

What is claimed is:

1. A method for interaction between a paper media and a reader, the method comprising:

Step 1: scanning, by a two-dimension (2D) barcode scanning means, an image of a 2D barcode in the paper media, and transmitting a scanning result to a 2D barcode identification means;

Step 2: identifying, by the 2D barcode identification means, a data structure of the image of the 2D barcode, displaying, on a terminal, items for feedback by the reader, and in response to the reader's selection of an item among the displayed items for feedback, calling an identification feedback module API and notifying an identification feedback means;

Step 3: displaying, by the identification feedback means, the item selected by the reader and receiving the reader's feedback about the item, and transmitting the feedback to a feedback response means; and Step 4: after the feedback response means receives the feedback from the reader,
displaying the feedback,
receiving a response of an editor of the paper media to the feedback from the reader wherein the response is made by using an editing platform, and
transmitting the response to the reader via the feedback response means.

2. The method according to claim 1, wherein the step of identifying the data structure of the image of the 2D barcode comprises steps of:

converting the collected image of the 2D barcode into a binary image according to a threshold theory of a point operation by performing binarization operation on the image of the 2D barcode;

after acquiring the binary image, performing dilation operation thereon; and performing edge detection on the dilated image to obtain a profile of a barcode region, wherein the binarization operation on the image of the 2D barcode is performed by the following equation:

$$g(x, y) = \begin{cases} 255 & f(x, y) \geq T \\ 0 & f(x, y) < T \end{cases}$$

wherein f(x, y) represents a gray value of a pixel at point (x, y), and T represents a threshold;

wherein the dilation operation on the binary image is performed by the following equation, wherein A is dilated by B:

$$A \oplus B = \{x \mid [(\hat{B})_X \cap A] \neq \Phi\}.$$

3. The method according to claim 2, wherein the step of performing edge detection on the dilated image further comprises steps of modifying a border of a barcode region after the edge detection, and splitting out a complete barcode region, wherein the step of modifying the border comprises:
dividing the symbol from a small region within the symbol using a region growing method, so as to modify the border of the barcode and include all points of the symbol within the border;
splitting out the entire symbol through convex hull algorithm; and
performing the region growing and convex hull algorithm alternately, so as to perform the region growing and convex hull algorithm twice on the barcode with a large density for the modular combination, while four times on the barcode with a small density for the modular combination.

4. The method according to claim 1, wherein in Step 1, the image of the 2D barcode in the paper media is scanned via a camera by using terminal software on a smart phone, a tablet computer or a PC.

5. The method according to claim 4, wherein in Step 4, after the response is received from the editor of the paper media, the feedback response means releases the feedback and the response.

6. The method according to claim 5, wherein in Step 4, after the response is received from the editor of the paper media, the feedback response means prompts, by the terminal software, the reader that there is a response to the feedback.

7. The method according to claim 6, wherein Steps 3 and 4 are repeated so as to provide the feedback and the response repeatedly.

8. The method according to claim 5, wherein Steps 3 and 4 are repeated so as to provide the feedback and the response repeatedly.

9. The method according to claim 4, wherein Steps 3 and 4 are repeated so as to provide the feedback and the response repeatedly.

10. A system for interaction between a paper media and a reader, the system comprising a client and a server,
wherein the client comprises:
a two-dimension (2D) barcode scanning means configured to scan an image of a 2D barcode in the paper media, and transmit a scanning result to a 2D barcode identification means;
the 2D barcode identification means configured to identify a data structure of the image of the 2D barcode, display items for feedback by the reader, and in response to the reader's selection of an item among the displayed items for feedback, call an identification feedback module API and notify an identification feedback means; and
the identification feedback means configured to display the item selected by the reader, receive the reader's feedback about the item, and transmit the feedback to a feedback response means of the server;
wherein the server comprises the feedback response means configured to, after receiving the feedback from the reader,
display the feedback,
receive a response of an editor of the paper media to the feedback from the reader wherein the response is made by using an editing platform, and
transmit the response to the reader via the feedback response means.

11. The system according to claim 10, wherein the 2D barcode scanning means comprises a camera of a smart phone, a tablet computer or a PC.

12. The system according to claim 11, wherein the feedback response means is configured to release the feedback and the response.

13. The system according to claim 12, wherein the feedback response means is configured to prompt the reader that there is a response to the feedback.

* * * * *